Sept. 19, 1967 J. F. JAMMET 3,342,644
SEALED ELECTROCHEMICAL CELLS
Filed Jan. 28, 1965
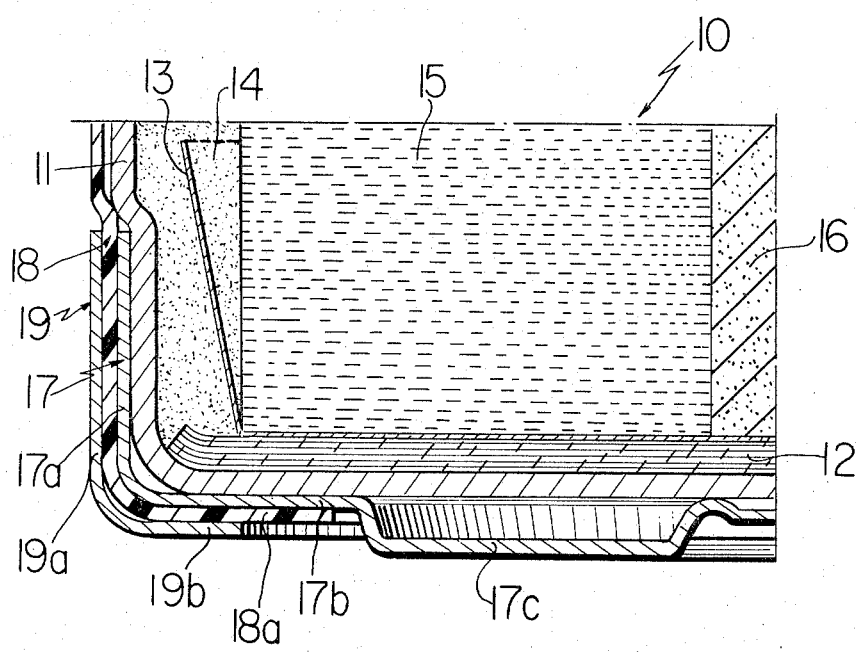
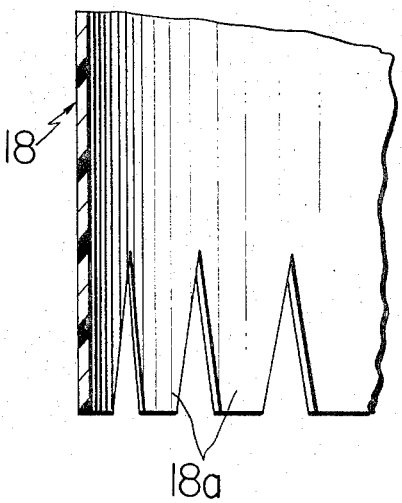
INVENTOR
JEAN FIRMIN JAMMET
BY
ATTORNEYS

United States Patent Office 3,342,644
Patented Sept. 19, 1967

3,342,644
SEALED ELECTROCHEMICAL CELLS
Jean Firmin Jammet, Poitiers, France, assignor to Societe des Accumulateurs Fixes et de Traction (Société Anonyme), Romainville, France, a company of France
Filed Jan. 28, 1965, Ser. No. 428,714
Claims priority, application France Aug. 4, 1964, 984,121
1 Claim. (Cl. 136—133)

This invention relates to sealed electrochemical cells preferably of overall cylindrical shape generally enveloped in a casing of plastic or equivalent insulative material.

My copending U.S. application Ser. No. 42,625, filed July 13, 1960 (now U.S. Patent No. 3,168,420), already discloses an arrangement which effects liquid leak-proof tightness in a cylindrical electrochemical cell enveloped in a casing of plastic material. This arrangement includes a metal ring having substantially L-shaped half section positioned to cover the lower end of the cup-shaped zinc electrode, the said ring lying outwardly of the casing and having its inwardly turned flange portion covering the inwardly turned castellated edge of the plastic casing, said ring being reduced in diameter after application over the plastic casing so that it presses against the cylindrical surface of the cup-shaped electrode through the castellated portion of said casing, thus achieving leak-proof tightness. Optionally, a metal contact disc is included at the bottom of the cell which is pressed against the bottom of the zinc electrode by the inturned flange of the ring.

This arrangement ensures very good leakproof tightness as long as the zinc cup remains insufficiently corroded or consumed incidental to use to constitute a rigid-enough support so that the castellated portion of the plastic casing remains tightly squeezed between it and the ring.

However, in use, at the end of a low rate discharge or of a very thorough discharge, due to the chemical dissipation and at least partial consumption and disappearance of the zinc electrode cup, such support fails. As a result, the tight seal is destroyed and the risk of leakage of electrolyte occurs. Such electrolyte being corrosive in nature, provides definite probability of damage to the battery container or other support for the cell and adjacent surroundings.

Principal objects and features of the present invention are the provision of a sealed electrochemical cell of the same or similar character in which the aforementioned drawbacks are eliminated and wherein leakproof tightness is ensured from the commencement of discharge to substantially complete consumption of the zinc cup electrode or other consumable electrode, and methods of manufacturing such cell.

Other objects and features of the invention are the provision of a sealed leakproof electrochemical cell of generally cylindrical configuration having a consumable electrode cup as its outer electrode, whose outer cylindrical surface is enveloped in a protective insulative casing preferably of plastic material, and the provision of means to provide a leakproof seal at the bottom of said cup, said means including providing the said casing with a lower castellated or serrated end which is turned laterally inwardly without thickening onto the bottom of the electrode cup; further in providing a sealing cup which fits around said electrode cup and which is interposed between the latter and said inturned castellated end, and providing a ring of substantially L-shaped half-section which is fitted over said insulative casing; the sealing cup after its application to the electrode cup being reduced in diameter to insure good contact with the electrode cup, and thereafter the insulative casing being applied and its castellated end turned inwardly over the bottom of the sealing cup without thickening, and subsequently the ring of L-shaped half-section being applied over the castellated end of the insulative casing and being reduced in diameter to compress or squeeze the lower end of the casing and its castellated end against the underlying surface of said sealing cup. These operations provide a leakproof seal at the lower end of said electrode cup which, because the sealing cup is not consumed by the electrolyte during use of the cell, remains effective for the life of the cell irrespective of the extent of consumption of said electrode cup during discharge and until such consumption has extended to substantially the full length of the useful life of said electrode cup. Thus, since an effective leakproof seal is thus established and maintained, the possibilities of damage from leakage of electrolyte are eliminated and longer effective cell life also results.

Other advantages and features of the invention will become apparent from the following detailed description and the accompanying drawings forming a part hereof, wherein:

FIGURE 1 is a fragmentary sectional view of the lower end of an electrochemical cell, for example of the Leclanché type whose lower end has been made leakproof by the practice of this invention; and FIGURE 2 is a fragmentary longitudinal section illustrating the lower tubular part of the insulative casing which has been castellated or serrated for use in practicing this invention.

Referring to the drawing, the reference character 10 denotes generally a preferably cylindrically-shaped electrochemical cell, for example, of the Leclanché type made according to this invention. The cell may have other than cylindrical shape. This cell 10 includes the cylindrical or tubular outer zinc cup negative electrode 11 which contains the other cell components including a bottom disc 12, for example, of paraffined cardboard which is positioned internally of said cup and rests on its bottom. A shallow cup 13, for example, of Kraft paper rests on said disc 12 and extends upwardly into conventional jellifying electrolytic paste 14 which is deposited within said zinc cup electrode 11. Preferably, this paste jellifies at room temperature or thereabouts. A conventional depolarizer mix 15 is centrally positioned within the Kraft paper cup 13 being provided in usual manner with the conventional, centrally-located, axially-extending positive carbon electrode rod 16.

All of these components are adapted to be sealed into electrode cup 11 at the upper end of the latter in any well-known and conventional manner and which has not been shown.

In order to provide an effective long-life, leak-proof seal at the lower end of the cell 10 externally of its zinc cup electrode 11, the novel structural features and components of this invention are provided. To this end, an external tubular or cylindrical metallic sealing cup 17, made, for example, of tinned or galvanized iron is provided. The cylindrical or tubular side wall 17a of this cup is relatively shallow and the bottom wall 17b may be provided with conventional flutings 17c. These flutings provide one of the electrical contacts for the cell. Normally, the diameter or dimensions of this sealing cup 17 are slightly in excess of the diameter or corresponding dimensions of the zinc electrode cup 11, being originally, for example, 0.1 to 0.2 mm. larger. The sealing cup 17 is applied over the bottom end of the electrode cup 11 before the latter has been loaded with its aforementioned contents with its bottom 17b resting against the bottom of zinc electrode cup 11.

The electrode cup 11 after being fitted with said sealing cup 17 is then forced through an appropriate reducing die (not shown) to reduce the diameter or dimensions of the wall 17a of said sealing cup between 0.2 and 0.3 mm.

This die-reducing operation also reduces the diameter or dimensions of the underlying side wall portion of electrode cup 11 and further insures good electrical contact between the said wall 17a of the sealing cup and the corresponding underlying side wall of the zinc electrode cup 11. It also serves to effect good and permanent contact between the bottoms of said two cups 11 and 17. The extent of dimensional reduction as thus effected also is such that the outer dimension of said sealing cup 17 then is approximately equal to that of the wall of the zinc cup 11 just above the upper rim of the side wall 17a of such sealing cup where the dimension or diameter of said zinc cup 11 has not been reduced.

When said dimensional reduction has thus been effected, a cylindrical or tubular casing 18 of insulative material, for example, a polyethylene plastic or the like dimensioned to fit telescopically over the outer surfaces of said two cups is provided. This casing 18 at its lower end is castellated or serrated, as seen in FIGURE 2, and the serrations 18a thereof are adapted to be turned inwardly laterally without thickening to lie against the outer surface of the bottom 17b of said sealing cup 17.

Thereafter, a metallic ring member 19 that is substantially L-shaped in half-section is mounted over the lower end of said casing 18 with its side wall portion 19a overlying the side wall of casing 18a and its inwardly turned flange portion 19b lying pressed against the inwardly turned serrations 18a of said insulative casing 18. The original inner dimension or diameter of portion 19a of ring member 19 is approximately 0.1 to 0.2 mm. greater than the wall dimension or diameter of the insulative casing 18 over which it has been mounted.

The flange portion 19b of said ring member when so mounted is snugly pressed against the serrations 18a of the insulative casing to squeeze or compress the latter tightly against the bottom 17b of sealing ring 17 and while this squeezing or pressing action is maintained, the wall portion 19a of said ring 19 is subjected to a dimensional or diametrical reduction of about 0.3 to 0.5 mm. in an appropriate die-reducing operation (not shown) in well-known manner. This dimensional reduction results in a further dimensional reduction of approximately 0.1 mm. in dimension or diameter of the sealing cup wall 17, and upon its completion the outer dimension or diameter of ring member 19 is approximately equal to the un-reduced dimension or diameter of the casing 18 just above the upper rim of said ring member 19.

The outer profile of the assembled components is then substantially a continuous straight line from the top to the bottom of the cell 10. In addition, the lower end of the insulative casing 18, as well as its inwardly turned serrations 18a are tightly and permanently squeezed or compressed between registering side and bottom wall portions of the metallic ring 19 and sealing cup 17, thereby providing a permanent tight leak-proof seal thereat which is independent of the extent or degree of consumption of the zinc cup 11 and the thickness of its wall portions in the zones underlying said ring 19 and sealing cup 17. The flutings 17c of the latter project downwardly and outwardly through the opening defined by flange portion 19b of ring 19 to provide one of the electrical contacts for the cell.

While the diametrical or dimensional reduction steps have hereinabove been described as being effected sequentially, it is to be understood that they may be effected as a single step after the ring member 19 has been mounted on casing 18, the total reduction in diameter or dimension of various parts then being a summation of the individual diametrical or dimensional reductions effected when they are effected sequentially, it being understood that in such event additional precautions will be required, for example, to maintain the components in assembled condition until such dimensional reduction can be effected.

One of the advantages resulting from this invention is that because the plastic casing 18 is squeezed between a sealing cup 17 and a metal ring member 19, neither of which is affected by electrolyte during the whole discharge life of the cell, the sealing compression on said casing parts effected by the described squeezing action is independent of the initial electrode cup thickness or in changes occurring therein as a result of its consumption during discharge. This even permits use of zinc electrode cups of less than usual thickness, since the tightness of the seal is no longer dependent upon the extent of such thickness.

Moreover, electric contacts between component parts are improved since contact between the sealing cup 17 and the zinc electrode cup 11 exist over a large area whereas in previous constructions which included only a bottom contact disc, contact only existed between the surface of such disc and the bottom of the electrode cup, said disc being maintained in position by the ring of substantially L-shaped half-section.

As a further advantage of the process according to the invention, particularly if the dimensional reducing actions are effected in sequence, in the first reduction wherein the sealing cup 17 is reduced relative to the outer dimensions of the electrode cup 11, the latter is passed through a die which automatically alters the outer dimensions of any zinc cup 11 to the correct outer dimensions therefor even if accidentally it had dimensions in excess of the correct conventional ones.

Although specific embodiments of the invention have been described and shown, variations in detail within the scope of the appended claim are possible and are contemplated. There is no intention, therefore, of limitation to the exact disclosure hereinabove presented.

What is claimed is:

A leak-resistant electrochemical cell comprising a cylindrical electrode cup having a closed bottom, a cylindrical metallic sealing cup also having a closed bottom mounted on said electrode cup with the bottoms in contact and having finally reduced dimensions to effect permanent assembly of the two cups with intimate electric contact therebetween, an insulative cylindrical casing of plastic material telescopically mounted on the assembled cups and having serrations at its lower end that are turned inwardly without thickening to lie against the bottom of said sealing cup, a metallic ring member of substantially L-shaped one-half section having a tubular part and a lateral flange part mounted on said casing adjacent said bottoms with the tubular part of finally reduced dimensions equal substantially to the outer dimensions of the cylindrical electrode cup to effectively squeeze and compress the casing between itself and the underlying portion of the sealing cup and thus to provide a substantially unbroken straight line profile to the cell as well as maintain rigid sealing engagement between the casing compressed between walls of the ring and sealing cup even when the electrode cup has been consumed and with the flange part effectively squeezing the serrations against the bottom of said sealing cup thereby providing a substantially leak-proof seal for said cell in the region of said casing covered by said ring member which is independent of corrosion and the extent of consumption of said electrode cup during use of said cell.

References Cited

UNITED STATES PATENTS

| 2,396,693 | 3/1946 | Glover | 136—133 |
| 2,552,091 | 5/1951 | Glover | 136—133 |
| 2,642,471 | 6/1953 | Reinhardt et al. | 136—133 |
| 3,168,420 | 2/1965 | Jammet | 136—133 |

FOREIGN PATENTS

| 1,242,313 | 8/1960 | France | 136—133 |

WINSTON A. DOUGLAS, *Primary Examiner.*

ALLEN B. CURTIS, *Examiner.*

D. L. WALTON, *Assistant Examiner.*